United States Patent [19]
Swett et al.

[11] 3,834,437
[45] Sept. 10, 1974

[54] MOLD FOR INGESTIBLE SUBSTANCES

[76] Inventors: James P. Swett; Harold P. Ashton, both of Providence, R.I.

[22] Filed: Aug. 28, 1972

[21] Appl. No.: 284,014

Related U.S. Application Data

[62] Division of Ser. No. 91,147, Nov. 19, 1970, Pat. No. 3,700,204.

[52] U.S. Cl. .................................................. 150/.5
[51] Int. Cl. ............................................ B41b 11/62
[58] Field of Search ........................... 150/.5; 220/60

[56] References Cited
UNITED STATES PATENTS

| | | | |
|---|---|---|---|
| 2,487,400 | 11/1949 | Tupper | 150/.5 |
| 2,776,691 | 1/1957 | Tupper | 150/.5 |
| 3,365,092 | 1/1968 | Blessing | 150/.5 X |
| 3,598,271 | 8/1971 | Holley | 220/60 R X |

*Primary Examiner*—Donald F. Norton

[57] ABSTRACT

A reusable molding kit and method of molding ingestible substances. The kit comprises a central mold portion and a multiple seal closure having a depressed portion which is inwardly directed. The central mold portion has smaller and larger end openings either of which can be sealed by the multiple seal closure. The depressed portion in the multiple seal closure causes a hollow well to be formed in the molded substance. The hollow well can be filled with various different substances to give a pleasing appearance. The depressed portion also serves as an additional mold for ingestible substances. A multicolored molded substance may be formed by filling the central mold portion with a moldable substance, filling the depressed portion with a second moldable substance having a different color, hardening the substances, removing the substances and inserting the second substance into the hollow well formed in the first substance.

2 Claims, 8 Drawing Figures

PATENTED SEP 10 1974

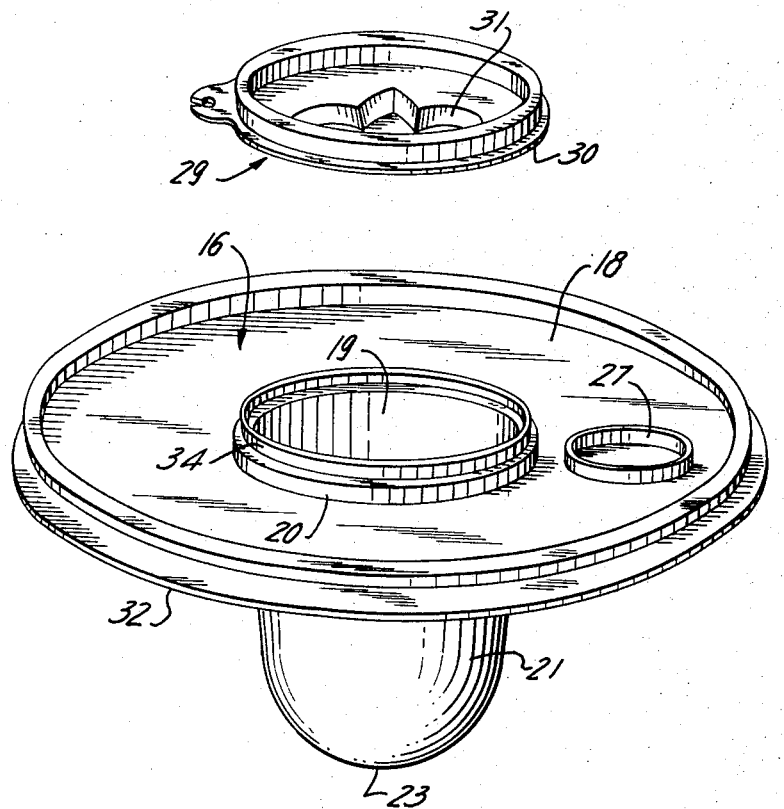
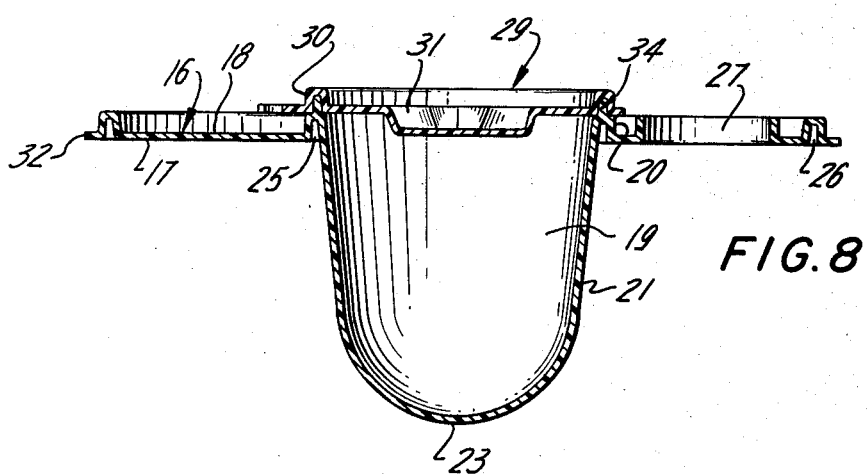

MOLD FOR INGESTIBLE SUBSTANCES

This is a division of application Ser. No. 91,147, filed Nov. 19, 1970 now U.S. Pat. No. 3,700,204.

BACKGROUND OF THE INVENTION

1. Field of Invention

This invention relates to a method and a mold for producing decorative effects in molded materials such as gelatin desserts and ice and more particularly to a kit in which a variety of configurations and combinations of moldable ingestible materials may be produced. Foodstuff material of a congealable nature such as gelatin desserts are particularly adapted for use with the mold and kit of the present invention in a manner so as to produce a variety of configured salad and dessert dishes.

2. Description of the Prior Art

Ice and foodstuff molds were known in the prior art, however, the known molds lacked flexibility in producing a variety of configurations of molded materials and were unable to produce ice shapes which would float high in a liquid such as punch so that the molded form of the ice could be seen. None of the molds known in the prior art had a dual molding capacity so that one color of molded foodstuff could be inserted into a different color of molded foodstuff to produce a glistening marbled effect. Foodstuff molds in the prior art which produced a ring shape had serious disadvantages. The center of the ring was generally filled with a material such as whipped cream or fruit. The hole in the ring went completely through the molded material. When whipped cream or fruit was placed in the center hole it would pass completely through the molded material to the surface of the dish or other container. If the ring was accidently moved the cream or fruit would become wedged beneath the molded material causing a messy unpleasant appearance. Foodstuff molds in the prior art had a further disadvantage in that when the center was filled with a material such as whipped cream or the like the cream would have a tendency to become dry at its surface. None of the molds in the prior art had a reversible seal which could produce a storage space for whipped cream, fruit or another molded material which opened either from the top or from the bottom. None of the molds for congealable foodstuff or the like could be used to form either a solidly molded material, a ring, or a configuration having a large storage space with either a top or bottom opening which could be filled with fruit, whipped cream or the like and which did not pass completely through the molded material. None of the molds in the prior art had a dual molding capacity in which either molding compartment could mold a substance having a pattern such as a star in its surface. None of the molds in the prior art could produce a molded shape of two different colored congealable substances in which the top central portion of the molded material was a flat surface having a different color than the surrounding molded material. In the prior art foodstuff molds which had patterns on the seal could not be easily filled. When the seal was placed on the filled mold the pattern which projected into the liquid which was to congeal displaced a portion of the congealable liquid causing the liquid to run down the outside surface of the mold. None of the molds in the prior art could be used alternatively as molds for congealable foodstuff and for ice or other materials wherein the formed ice had a storage space which could hold fruit or the like while the ice was floating in a liquid such as punch.

BRIEF DESCRIPTION OF THE INVENTION

This invention relates to a reusable molding kit for ice and foodstuffs of the type that are introduced into a mold as a moldable material and formed in the mold to a shape-retaining solid conforming to the contours of the mold. The molding kit includes a multiple-seal closure which can seal either the larger or smaller opening in a central mold portion. The multiple-seal closure has a depressed portion inwardly directed from a centrally located hole located in a disk-shaped sealing wall. The depressed portion extends into the central mold portion when the multiple-seal closure is engaged with either the smaller base opening or the larger opening of the central mold portion. When the mold is filled with water, gelatin dessert or other ingestible material which subsequently congeals or hardens to a shape retaining solid, the molded solid has an inwardly directed hollow portion.

BRIEF DESCRIPTION OF THE DRAWINGS

FIG. 7 is an exploded view of an alternate structure for the multiple-seal closure showing the base seal at the opening of the cup-shaped central portion of the multiple-seal closure; and FIG. 8 is a cross-sectional view of an alternate structure for the multiple-seal closures showing the base seal in interfitting relation with the opening of the cup-shaped central portion of the multiple seal closure.

PREFERRED EMBODIMENT

Figure 1:
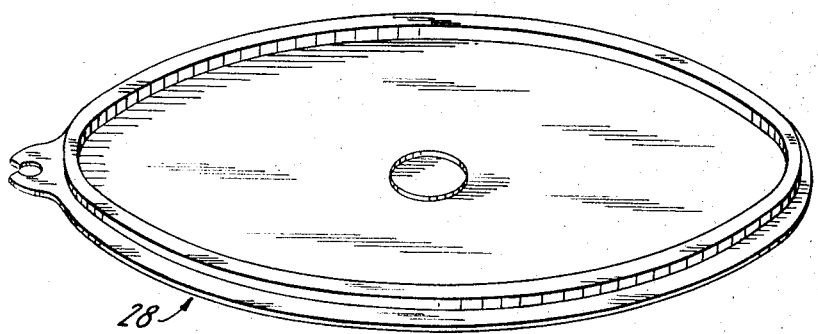
FIG. 1 is an exploded perspective view of the mold with the flat plastic closure on the larger end and the base seal on the smaller base end of the central mold portion.
Figure 1:
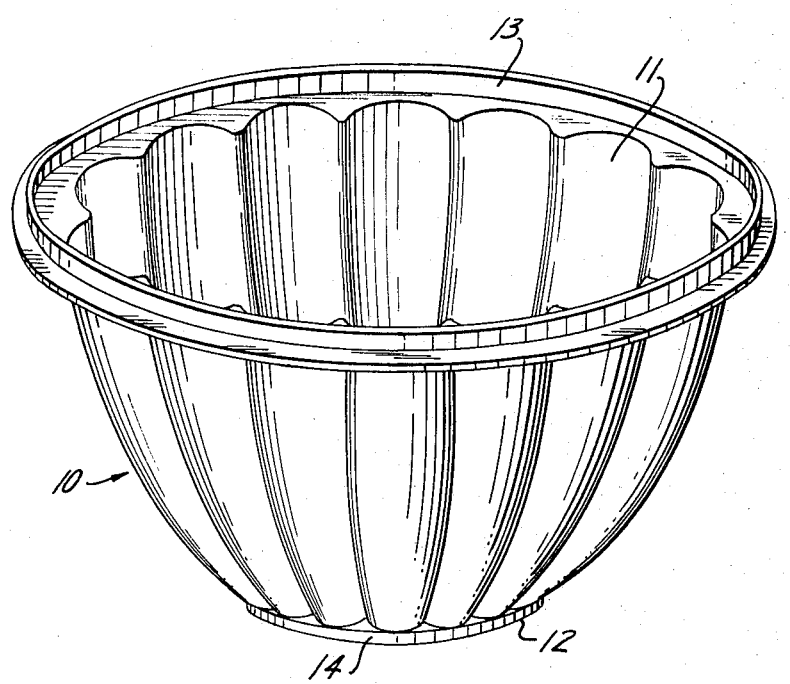
Figure 1:
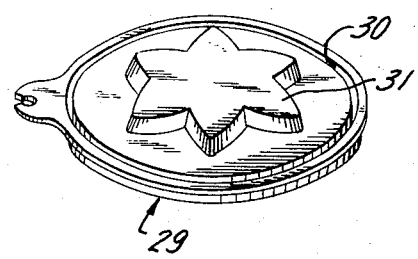
Figure 2:
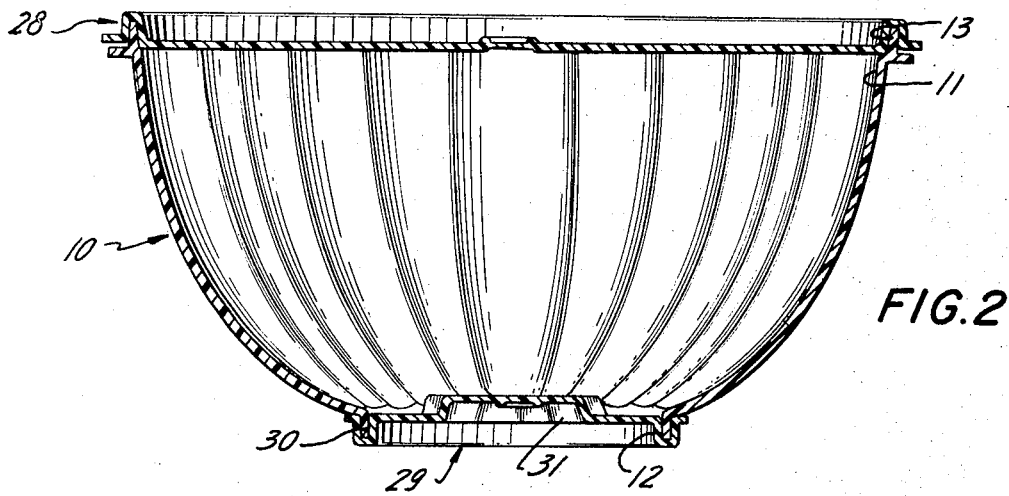
FIG. 2 is a cross-sectional view of the assembled mold with the flat plastic closure on the larger end and the base seal on the smaller base end of the central mold portion.
Figure 4:
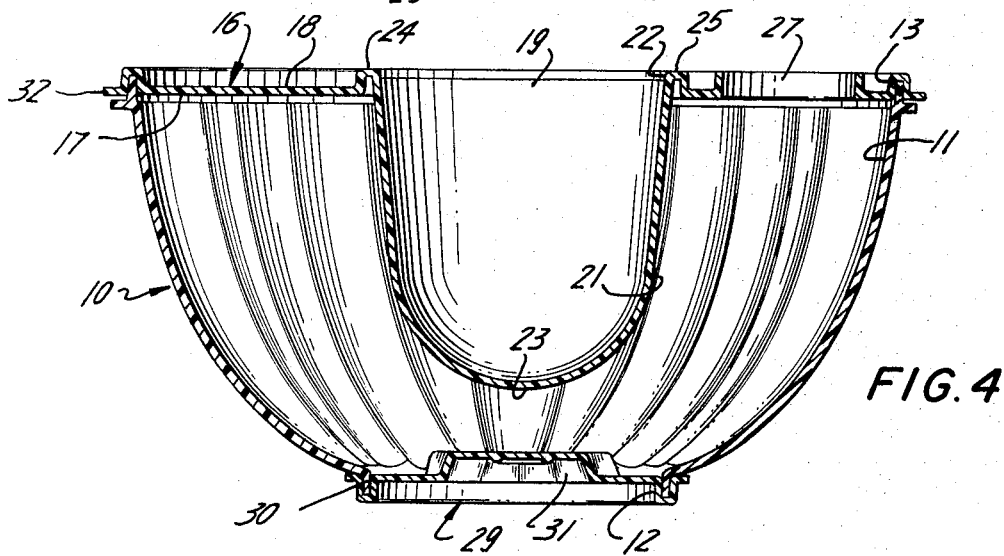
FIG. 4 is a cross-sectional view of the assembled mold with the multiple-seal closure on the larger end and the base seal on the smaller base end of the central mold portion.
Figure 3:
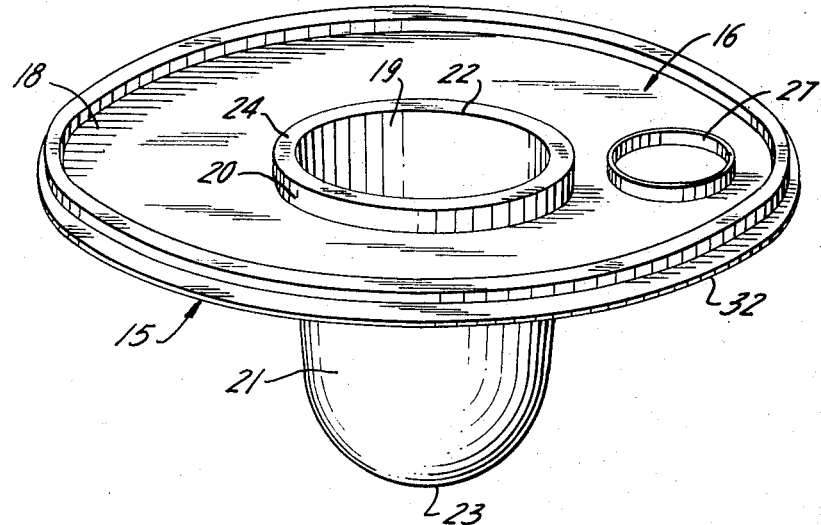
FIG. 3 is an exploded perspective view of the mold with the multiple-seal closure on the larger end and the base seal on the smaller base end of the central mold portion.
Figure 3:
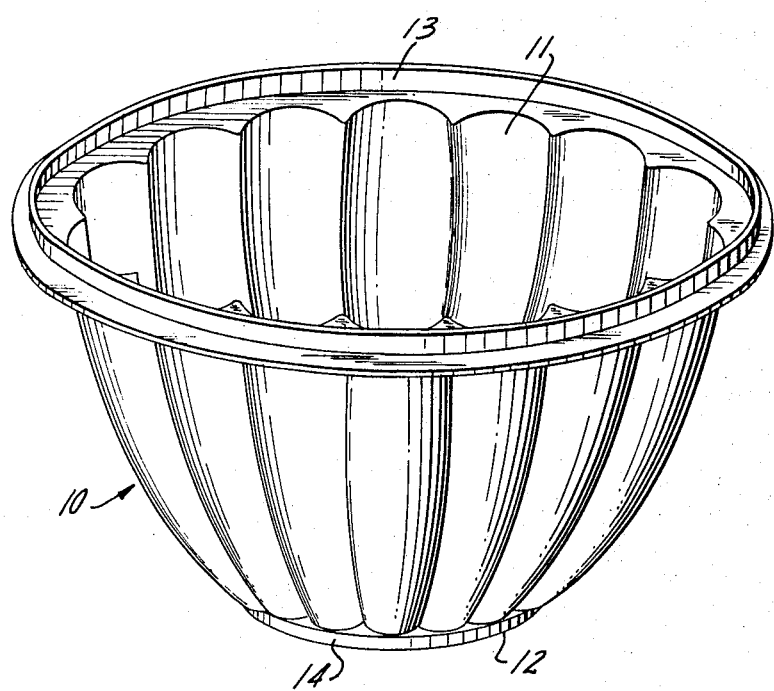
Figure 3:
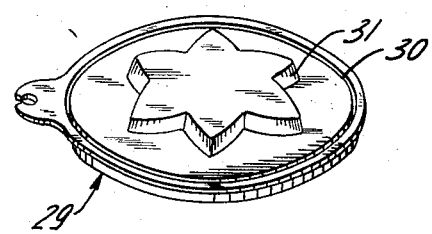
Figure 5:
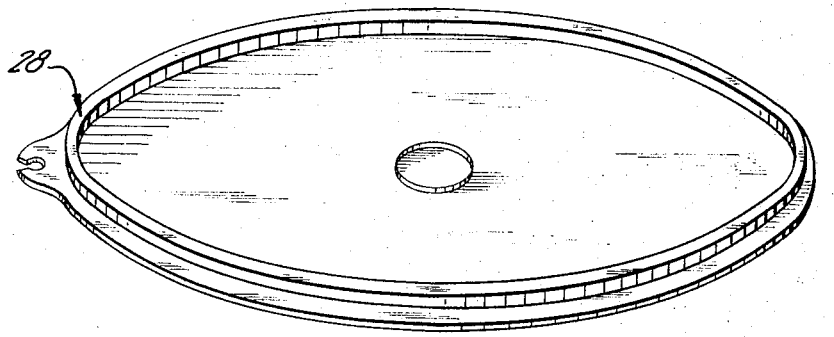
FIG. 5 is an exploded perspective view of the mold with the flat plastic closure on the larger end and the multiple-seal closure on the smaller end of the central mold portion.
Figure 5:
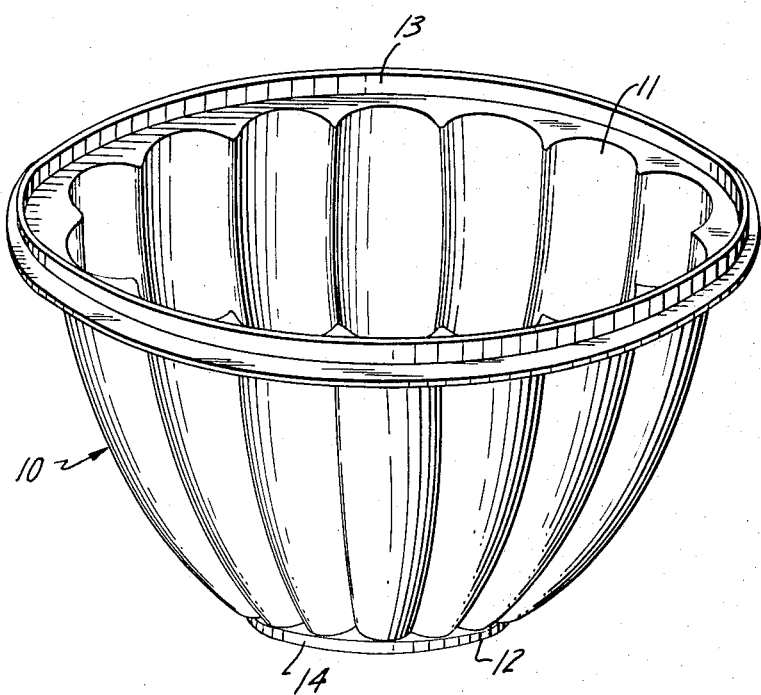
Figure 5:
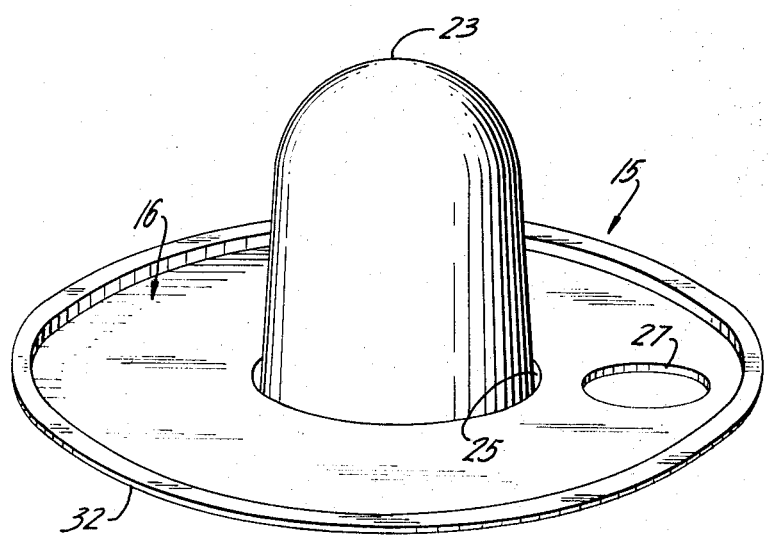

In the preferred embodiment of this invention the reusable molding kit for ice and foodstuffs of the type that are introduced into the mold as a moldable material and formed therein to a molded shape retaining solid is fabricated from plastic materials and as best seen in FIGS. 1, 3 and 5 includes a central mold portion 10, a multiple seal closure 15, a substantially flat plastic closure 28 and a base seal 29. The central mold portion 10 is contoured from a larger opening 11 at one end thereof to a smaller base opening 12 at the other end. The larger opening 11 is provided in the central mold portion 10 for the removal of the shape-retaining product from the mold. The larger opening 11 is defined by an upstanding peripheral rim 13 and the smaller base opening 12 is defined by downwardly extending peripheral rim 14. The smaller base opening 12 and the integral downwardly extending rim 14 are adapted to maintain the central mold portion 10 in a stable-resting position when placed on a supporting surface.

Figure 6:
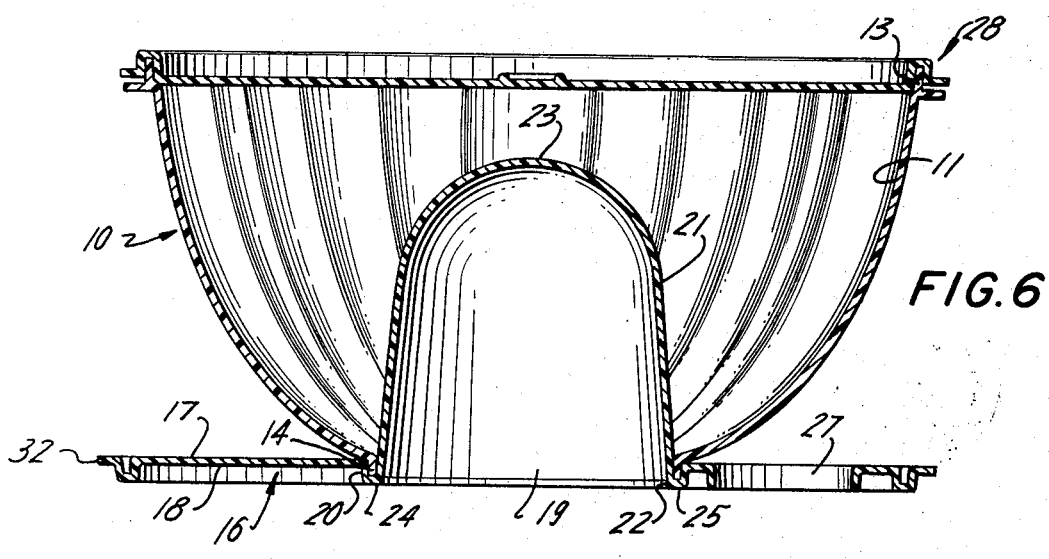
FIG. 6 is a cross-sectional view of the assembled mold with the flat plastic closure on the larger end and the multiple-seal closure on the smaller end of the central mold portion.

As shown in FIGS. 3, 5 and 6, multiple seal closure 15 has a disk-shaped sealing wall 16 which includes substantially flat inner and outer surfaces 17 and 18 and a peripheral edge 32. The disk-shaped sealing wall also has a centrally located circular hole 19 passing from outer surface 18 to inner surface 17 and a rim 20 upstanding from outer surface 18 and attached to the periphery of centrally located hole 19. A cup-shaped central portion 21 is inwardly directed from disk-shaped sealing wall 16. Cup-shaped central portion 21 has a base peripheral edge 22 and terminates in a hemispherical end wall 23. A connecting wall 24 joins upstanding rim 20 and base peripheral edge 22 to form central U-shaped groove 25 which opens on inner surface 17 of disk-shaped sealing wall 16. Central U-shaped groove 25 is adapted for sealing engagement with peripheral rim 14 of smaller base opening 12. Disk-shaped sealing wall 16 also has a peripheral U-shaped groove 26 opening on inner surface 17 proximate peripheral or circumferential edge 32 of disk-shaped sealing wall 16 which is adapted for sealing engagement with upstanding peripheral rim 13 of larger opening 11 when central U-shaped groove 25 is disengaged from downwardly extending peripheral rim 14. An intermediate opening 27 passes through disk-shaped sealing wall 16 between central U-shaped groove 25 and peripheral U-shaped groove 26 which permits the mold to be easily filled when multiple seal closure is engaged with larger opening 11.

As previously mentioned the molding kit preferably includes a substantially flat plastic closure 28 for engagement with upstanding peripheral rim 13 in a moisture-tight sealing relationship and may be employed subsequent to removal of the multiple-seal closure 15 after molding or alternatively when either closure 15 or seal 29 are used on opening 12 during molding.

The kit also includes base seal 29; FIGS. 1, 2, 3, 4, 7 and 8; for smaller base opening 12. Base seal 29 has base seal U-shaped peripheral groove 30 adapted to engage with downwardly extending peripheral rim 14 in a moisture-tight sealing relationship when multiple seal closure 15 is engaged with upstanding peripheral rim 13. Base seal 29 preferably has a central wall 31 configured to form a design on the molded product, however, a plain seal may be similarly employed.

If desired, multiple seal closure 15 need not be used and base seal 29 can be used to seal smaller base opening 12 while substantially flat plastic closure 28 is being used to seal larger opening 11.

In an alternative embodiment, FIGS. 7 and 8, it is contemplated that the base seal 29 may also be used to form a configured pattern in a solid formed in depressed cup-shaped portion 21. This particular embodiment includes a sealing flange 34 that extends outwardly from the connecting wall 24 of the multiple-seal closure 15. The flange 34, as is readily apparent from FIGS. 6 and 7, is adapted to matingly receive the base seal 29 or a similar seal in a substantially air-tight relationship. Thus, it is possible in one aspect of the invention to simultaneously but separately mold congealable materials in the central mold portion 10 and in the multiple-seal closure 15. Further, the material molded in the cup-portion 21 may be configured using the base seal 29.

It has been discovered that a molding kit in accordance with this invention makes possible several unique and unexpected results. For example, an unusual shimmering multicolored molded gelatin dessert can be prepared by molding a gelatin dessert having one color in the central mold portion and subsequently filling the hollow well portion in the molded gelatin dessert with a molded gelatin dessert having a second color formed in the shape of the hollow well portion. The gelatin dessert having the second color may be molded in the depressed portion of the reversible seal. Since the multiple seal closure may be placed on either the smaller base opening or the larger opening of the central mold portion the hollow well portion in the molded ice or foodstuff may be in either the top or bottom surface of the molded material. The gelatin dessert having a different color may be placed in either the top or the bottom of the molded material having the first color depending upon whether the multiple seal closure was placed on the smaller base opening or the larger opening of the central mold portion. Two multicolored molding effects may, therefore, be obtained from the same molding kit.

As was discussed in the previous paragraphs the molding kit has a dual molding capacity in that a material may be molded in the central mold portion while another material is being molded in the depressed portion of the reversible seal.

The multiple seal closure gives the molding kit additional flexibility in that the hollow well may be formed in either the top or bottom surface of the material which is molded in the central mold portion. Many of the effects possible with the molding kit are obtainable, however, when the seal having the depressed portion is not reversible but can be placed on only one end of the central mold portion. Further, it should be noted that an integral construction employing an inwardly directed depressed portion extending from the smaller end of the mold will similarly yield pleasing results. Such a well might also include a sealing flange to accommodate a seal, thus retaining the dual molding capability. The integrally connected depressed portion should extend over one-half of the distance from the smaller end to the larger end of the mold.

A molded congealable foodstuff having a hollow well portion in the top has particular advantages in that the well portion can be used as a storage space which gives a particularly pleasing aesthetic appearance. The hollow portion can be used to store such things as fruit or whipped cream. When the hollow well portion appears in the top of the congealable substance such as gelatin dessert another advantage was unexpectedly discovered. Substances such as whipped cream do not pass completely through the molded foodstuff to the plate below thus unsightly smearing of substances such as whipped cream on the plate does not occur. Molded ice having a hollow well portion in the top also has similar advantages. The molded ice can be floated in a punch bowl and the hollow well portion in the molded ice can be used as a storage space which gives the punch bowl an interesting, unusual and pleasing appearance.

A hollow well portion in the bottom of a congealable foodstuff such as a gelatin dessert also has particular advantages. When the hollow well portion is filled with substances such as fruit, whipped cream or the like a particularly pleasing appearance results. The fruit or whipped cream is viewed from the top through the gelatin dessert or the like which gives an interesting and unusual effect. In addition substances such as whipped cream have a tendency to dry when exposed to air. When the cream is stored in a well formed in the bottom of the foodstuff such as gelatin dessert or the like exposure to the air is eliminated.

It was unexpectedly discovered that a well portion formed in the bottom of molded ice had a particular advantage. When the ice is placed in a liquid such as punch or the like it floats higher thus exposing the molded ice form.

If for some reason a ring structure is desired, the reversible seal may be placed on the smaller base opening and the mold may then be partially filled to form a ring.

As indicated above it is prefered that a seal for the smaller base opening be provided with the molding kit. The smaller base seal is used to seal the smaller base opening of the central mold portion when the multiple seal closure is engaged with the larger end opening. The smaller base seal may be provided with a pattern which imparts an aesthetic appearance to the top of the molded ice or moldable foodstuff. The smaller base seal may be used to seal the depressed cup portion in the multiple seal closure thus permitting a molded pattern to be formed in ice or a molded foodstuff which is molded in the depressed cup portion of the multiple seal closure.

What is claimed is:

1. A multiple-seal closure comprising a disk-shaped sealing wall having an inner and outer surface, and a centrally located circular hole passing from said outer surface to said inner surface, a rim upstanding from said outer surface attached to the periphery of said centrally located hole, an inwardly directed depressed cup-shaped central portion having a base peripheral edge, and a connecting wall joining said rim and said base peripheral edge forming a central U-shaped groove opening on the inner surface of said disk-shaped sealing wall, said disk-shaped sealing wall further having a peripheral U-shaped groove opening on the inner surface of said wall proximate the peripheral edge of said disk-shaped wall and an opening through said disk-shaped wall between said central U-shaped groove and said peripheral U-shaped groove.

2. A multiple-seal closure comprising a sealing wall having an inner and outer surface, and a centrally located hole passing from said outer surface to said inner surface, a rim upstanding from said outer surface attached to the periphery of said centrally located hole, an inwardly directed depressed central portion having a base peripheral edge, and a connecting wall joining said rim and said base peripheral edge forming a central U-shaped groove opening on the inner surface of said sealing wall, said sealing wall further having a peripheral U-shaped groove opening on the inner surface of said wall proximate the peripheral edge of said sealing wall and an opening through said sealing wall between said central U-shaped groove and said peripheral U-shaped groove.

* * * * *